June 30, 1959 R. A. O'NEILL 2,892,647
RELEASABLE LOCKING MECHANISM FOR TELESCOPING MEMBERS
Filed May 3, 1954 2 Sheets-Sheet 1

INVENTOR
RALPH A. O'NEILL
BY Sol Shappirio
ATTORNEY

June 30, 1959 R. A. O'NEILL 2,892,647
RELEASABLE LOCKING MECHANISM FOR TELESCOPING MEMBERS
Filed May 3, 1954 2 Sheets-Sheet 2

INVENTOR
RALPH A. O'NEILL

BY Sol Shappiris
ATTORNEY 2,892,647

RELEASABLE LOCKING MECHANISM FOR TELESCOPING MEMBERS

Ralph A. O'Neill, Huntington, W. Va.

Application May 3, 1954, Serial No. 426,972

7 Claims. (Cl. 287—58)

This invention relates to releasable locking means for telescoping members capable of wide application and utilization in many articles of manufacture where two telescoping members are employed.

Structures have been proposed in the prior art for locking telescoping members to prevent movement with respect to one another. For example a screw detent is sometimes employed and tightened to hold the members together. Such devices are unsatisfactory since slippage cannot be avoided. In other cases spring-pressed elements are employed. These too are not always certain in action. Other devices employ locking means which require levers to release the locking means, such devices being subject to accidental displacement. Still further devices utilize sleeves and conical members in which ball bearings serve to lock the parts in position. Such structures are rather complicated, expensive to build, and difficult to repair.

Among the objects of the present invention is releasable locking means for telescoping members which are relatively simple in structure, certain in action, rigid in support, capable of sustaining the adjustment against relatively high pressures or large weight, and strong.

Other and further objects of the invention will appear from the more detailed description set forth below, such more detailed description being given by way of illustration and explanation, since many changes therein may be made by those skilled in the art without departing from the scope and spirit of the present invention.

In accordance with that more detailed description there is shown in the drawings.

Figure 1:
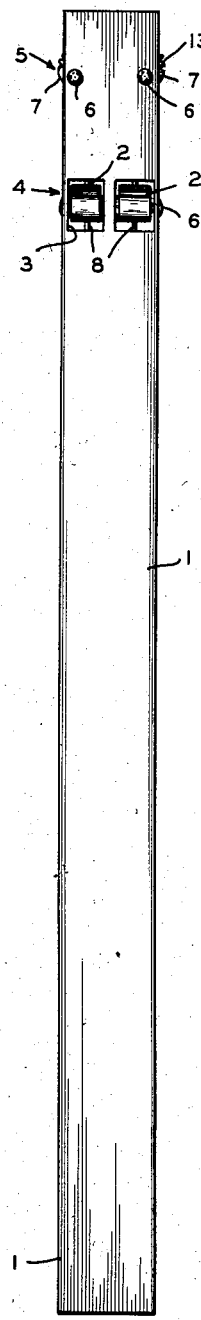
Figure 1 shows a side elevation of an inner of the telescoping members.

In accordance with the present invention, telescoping members are releasably locked in any desired relative position with respect to each other by a cam-shaped element pivotally held on one of the telescoping members and extending into contact with the wall of the other of the telescoping members. By control of the angle of contact of the cam shaped element with the wall of the member which it engages, the direction of movement of the telescoping members with respect to each other may be determined. Thus if the cam-shaped element on one member is positioned so that by movement in one direction, it will bite into the coacting wall on the other member, any extended movement of the latter member against the biting action is prevented. A flexible retaining element may be employed to cooperate with the cam-shaped element in neutral position in connection with reversal of movement. By reversing the angle of contact, movement in the opposite direction is permitted.

The number of cam-shaped elements employed will depend in part on how the stresses are to be distributed, how much weight is to be supported or how much force is to be resisted, the type of device in which the structure is employed, and the metal from which the structure is built. Any number of such cam-shaped elements and coacting parts may be used from one to four. Where two are employed they may desirably be placed in alinement on opposite walls of one of the telescoping members, usually on the inner member. Where four cam-shaped elements are used they may desirably be arranged in opposed pairs on the inner member the pairs being spaced from each other along the inner member each pair being on a line at right angles to the other. The specific structures illustrated in the drawings will employ four cam-shaped elements arranged in the manner described, but one or more may be used.

The telescoping members are tubular and may have any desired cross-sectional configuration such as square, hexagonal, round, oval, etc. The device may be made of cold rolled steel, or of stainless steel, or of any other desirable metal or alloy, the strength of the structure in part being determined by the metal used. Structures capable of supporting thousands of pounds weight in fixed position are readily and economically manufactured.

Each cam-shaped element and its coacting parts are identical. A flexible retaining element is provided to retain the cam-shaped element in a neutral position. And means are provided to change the angle of contact of the cam-shaped element with its coacting wall in order to reverse direction of movement of the telescoping members with respect to each other.

Referring to the drawings, inner member 1 is an elongated, square in cross-section, tubular member having dual cam-shaped element 2 pivotally mounted at 6 on member 1 near an end thereof. The wall of member 1 is cut-away to form opening 3 through which cam-shaped element 2 may project as at 7. To provide for four cam-shaped elements, these are arranged in opposite pairs, one pair being shown at 4, Figure 1, and the other pair spaced from the first pair and at right angles thereto as shown at 5. Each one of a pair of cam-shaped elements is positioned in opposite walls of member 1. Each cam-shaped element carries a flexible retaining member 8 attached to cam-shaped member 2 at its inward edge 9 as by welding or a screw 8' or in any other way. Retaining member 8 may be an elongated strap of V-shaped contour, having ends 10 adapted to contact alternately with inner wall 11 of inner member 1. Outer face 12 of cam-shaped element 2 is desirably serrated as shown at 13 for greater frictional contact with any coacting surface.

Figure 3:
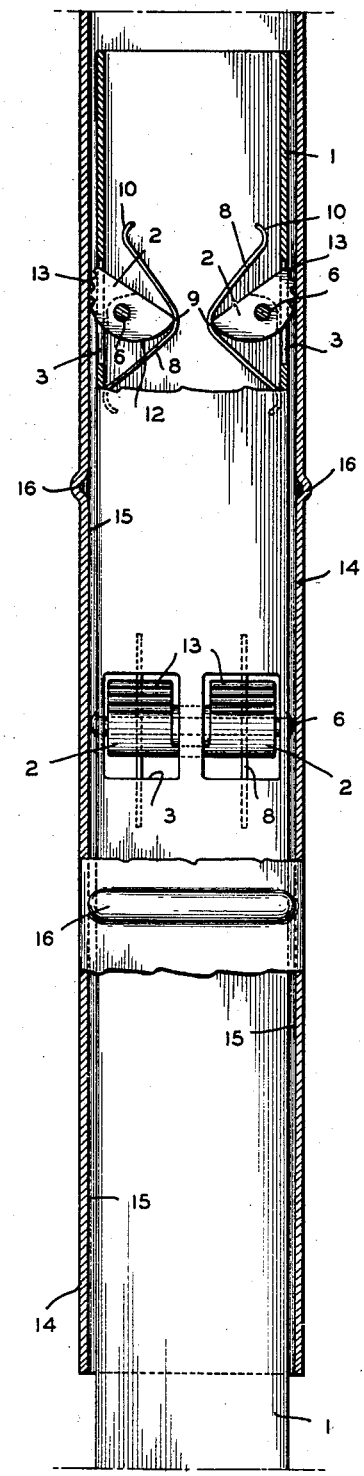
Figure 3 is an elevation partly in section through the assembled telescoping members.
Figure 4:
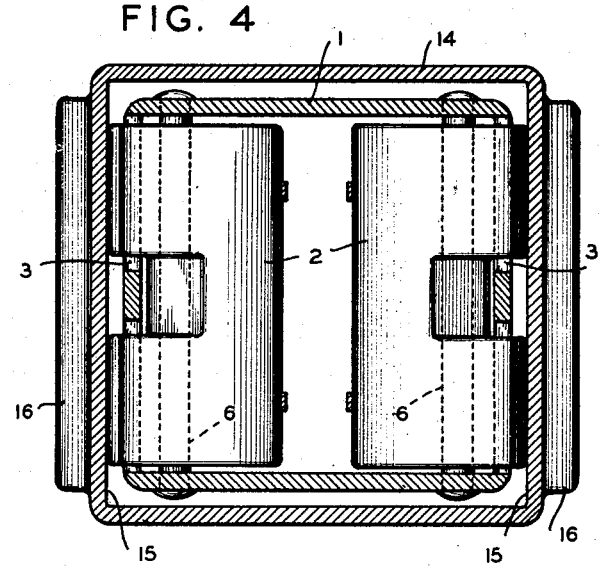
Figure 4 is a transverse section through Figure 3 looking down on the locking means with cam retaining elements removed.
Figure 5:
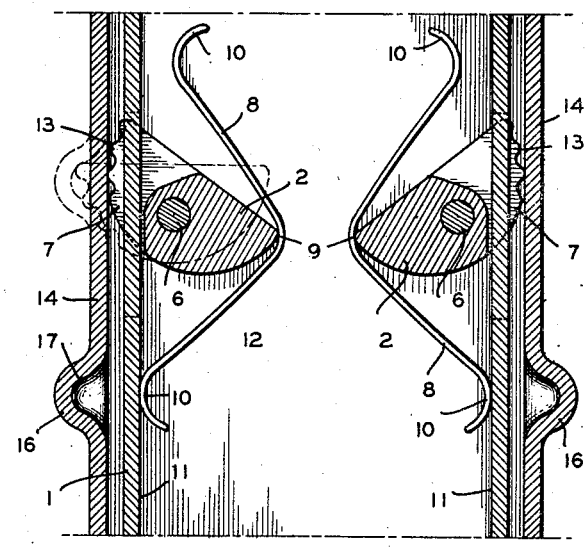
Figure 5 is a detailed section through a fragmentary portion of the assembled telescoping members showing the releasable locking means.

Outer telescoping member 14 is adapted under controlled conditions to move with respect to inner member 1, and inner walls 15 of said outer member 14 are adapted to contact with cam-shaped elements 2 to limit the relative direction of movement of the members with respect to each other depending on the angle of contact of element 2 with wall 15. As shown in Figure 3, elements 2 are pivotally positioned upwardly and outwardly. Consequently in the position shown in Figure 3, outer member 14 may move upwardly with respect to inner member 1 to be set at any desired point. If any attempt is made to move outer member 14 downwardly, serrated cam face 13 will wedge against wall 15 of member 14 and prevent movement. Movement of the outer tube in the direction of inclination of cams (inclination being upward when cam serrations 13 are above pivot 6) is free and unimpeded, but movement in opposite direction is not possible. Consequently outer member 14 may be moved upwardly to the limit of movement of the members with respect to each other.

Figure 2:
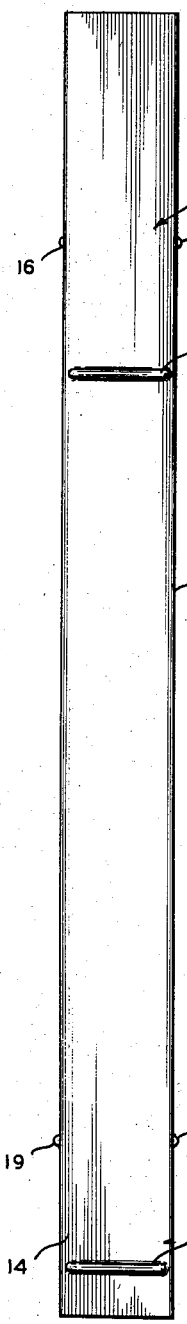
Figure 2 shows a side elevation of the outer of the telescoping members.
Figure 6:
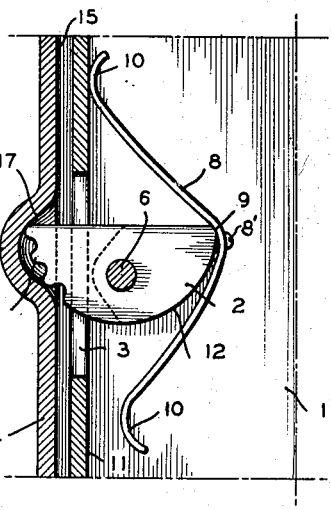
Figure 6 is a detail in section of the locking means to illustrate the reversal action.

To permit reversal of movement when outer member 14 is in lowermost position, the following structural features are employed. Outer member 14 carries depressions 19, there being one depression for reversing each cam-shaped member, all reversals taking place simultaneously by properly positioned depressions. As shown in Figure 6, when outer member 14 has been moved to the upper limit, cam face 13 is engaged by wall 17 and moved through the neutral position shown in Figure 6 to a downwardly and outwardly determined position and outer member 14 may then move downwardly with respect to inner member 1 to the lowermost position of members 1 and 14 with respect to each other. Depressions 19 are arranged on member 14 so that reversal of all cam shaped elements takes place simultaneously. For this purpose there will be a pair of depressions at one level on opposite walls of member 14 near one end thereof as shown at 16, Figure 2, and a second pair of depressions 19 on the other pair of walls of member 14 thus being alined at right angles to the other pair of depressions. The distance between the pairs of depressions will be equal to the distance between the alined pairs of cam-shaped elements 2 on member 1. Thus all cam-shaped elements are reversed in position simultaneously by depressions 19 at the upper end of movement of members 1 and 14 with respect to each other, as movement is initiated in the opposite direction.

An identical arrangement of depressions 16 is made at the other end of member 14 so that when outer member 14 has moved downwardly to its lowermost position, all cam-shaped elements are reversed in position to permit upward movement again of outer member 14 with respect to inner member 1. Thus outer member 14 may then be moved to any intermediate upward position and will be held securely in place wherever set.

Figure 7:
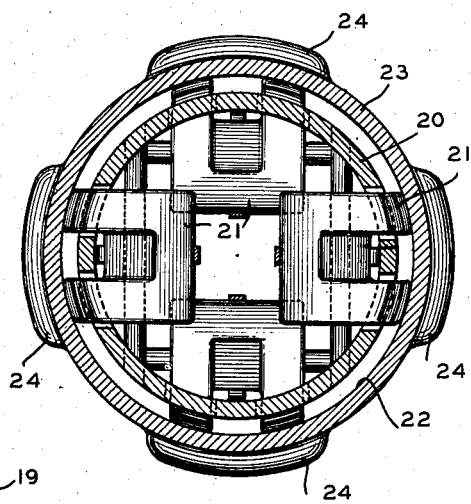
Figure 7 is a section through a modified form of the invention.

In Figure 7 a cross-section of a modification is shown in which the tubular elements are circular in cross-section. Otherwise the structure is identical with that of the structures of Figures 1 to 6. Inner telescoping member 20 carries four cam-shaped elements 21 adapted to coact with inner walls 22 of outer telescoping member 23 having reversing projections 24. All remaining features will be identical with those explained above.

Telescoping members of the present invention may be employed in any article of manufacture desired. Thus chair legs or the pedestal of a stool may be made in this way. A seat may be applied to the upper end of outer member 14 of Figure 3 and lower end of member 1 supported on the floor to give an adjustable seat of great strength and ready adjustability. Or the structure of Figure 7 may be used for tripod legs. Or lampstands may be built using either type of structure.

Having thus set forth my invention, I claim:

1. In a releasable locking device for telescoping members, tubular telescoping inner and outer members, the inner member having a side wall provided with an opening therein, a cam element pivotally mounted on the inner member with a cam end extending through the opening to engage against an adjacent solid inner wall of the outer member, a flexible elongated retaining element carried by the cam element, the ends of the retaining element extending beyond the cam element for alternate depression against the inner wall of the inner element with the cam element in working position to apply eccentric pressure at point of contact of the cam element to effect rotation of cam element to neutral positon for reversal of the direction of movement of the telescoping members with respect to each other.

2. In a device as set forth in claim 1, a concave depression on the inner wall of the outer member for contact with the cam element to rotate the latter sufficiently for reversing the angle of contact of the cam element with the inner wall of the outer member to enable reversal of the direction of movement of the telescoping members with respect to each other.

3. A device as set forth in claim 2 in which the cam element is in duplicate one on each of opposite walls of the inner member with openings in the side walls of the inner member to permit contact of the cam elements with opposite inner walls respectively of the outer member, each cam element carrying a flexible retaining element, there being a reversing depression on an inner wall of the outer member for each cam element.

4. In a device as set forth in claim 1, a depression on an inner wall of the outer member near one end thereof for contact with the cam element to rotate the latter sufficiently for fixing the angle of contact of the cam element with an inner wall of the outer member to enable movement of the telescoping members in one direction with respect to each other, and a depression on the inner wall of the outer member near the other end thereof for contact with the cam element to rotate the latter sufficiently for reversing the angle of contact of the cam element with the inner wall of the outer member to enable movement of the telescoping members with respect to each other in a direction opposite from that first mentioned.

5. A device as set forth in claim 4 in which the cam element is in duplicate one on each of opposite walls of the inner member with openings in the side walls of the inner member to permit contact of the cam elements with opposite inner walls respectively of the outer member, and each cam element carrying a flexible retaining element, a depression on each of opposite inner walls of the outer member near one end thereof for fixing the angle of contact of each cam element with its coacting wall to enable movement of the telescoping member in one direction with respect to each other, and a depression on each of the opposite inner walls of the outer member near the other end thereof for reversing the angle of contact of each cam element with its coacting wall to enable movement of the telescoping members with respect to each other in a direction opposite from that first mentioned.

6. A device as set forth in claim 4 in which the cam element is in quadruplicate, one pair thereof being alined oppositely on the inner members and the other pair being alined oppositely on the inner member spaced from the first mentioned pair and at right angles thereto, the inner member having openings to permit each cam element to extend through an opening into contact with a wall of the outer member, each cam element carrying a flexible retaining element the ends of each flexible retaining element being capable of alternate depression against the inner wall of the inner element, the ends both contacting walls when the retaining element passes through neutral position to reverse the cam element and thereby control the direction of movement of the telescoping members with respect to each other.

7. In a device as set forth in claim 6, a depression on each of opposite inner walls of the outer member near one end thereof for fixing the angle of contact of each of one pair of cam elements with its coacting wall to enable movement of the members in one direction, and a depression on each of the other opposite inner walls of the outer member on the same end thereof but spaced from the first mentioned depressions for fixing the angle of contact of each of the second pair of cam elements with its coacting wall for movement of the telescoping members in the same direction, a depression on each of opposite inner walls of the outer member near the other end thereof for fixing the angle of contact of each of a pair of cam elements with its coacting wall for movement of the telescoping members in the opposite direction, and a depression on each of the other opposite inner walls of the outer member on the same end thereof but spaced from the last mentioned depressions for fixing the angle of contact of each of the last named cam elements with respect to their coacting walls to enable movement of said members in said opposite direction.

References Cited in the file of this patent

UNITED STATES PATENTS

| | | |
|---|---|---|
| 156,497 | Peter | Nov. 3, 1874 |
| 178,733 | Carter et al. | June 13, 1876 |
| 883,938 | Charron | Apr. 7, 1908 |
| 2,243,190 | Capaldo | May 27, 1941 |
| 2,514,167 | Scott | July 4, 1950 |
| 2,594,605 | Zoppelt | Apr. 29, 1952 |
| 2,620,210 | Wuster | Dec. 2, 1952 |
| 2,722,970 | Stechmann | Nov. 8, 1955 |

FOREIGN PATENTS

| | | |
|---|---|---|
| 83,640 | Switzerland | Jan. 2, 1920 |
| 480,317 | Canada | Jan. 15, 1952 |